May 13, 1941. J. P. SPANG 2,241,648
MEAT-SLITTING MACHINE
Filed July 8, 1939 3 Sheets-Sheet 1
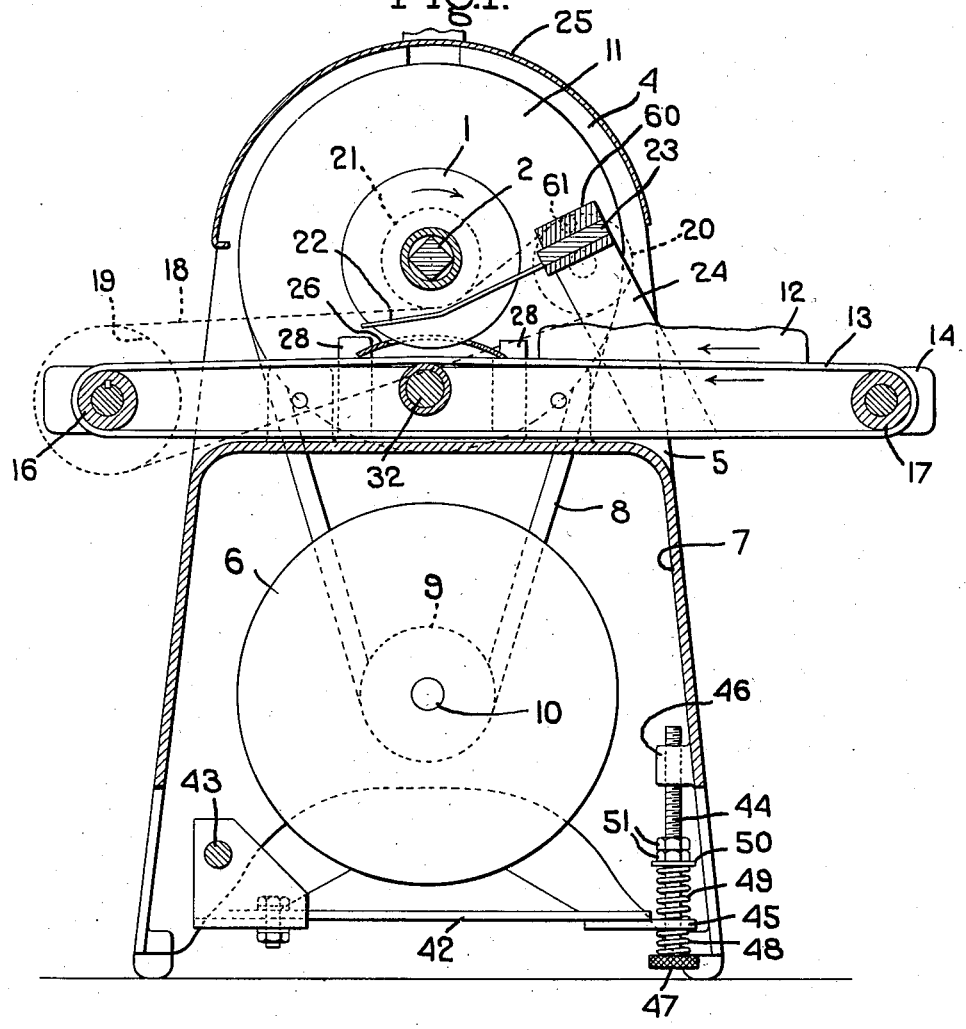
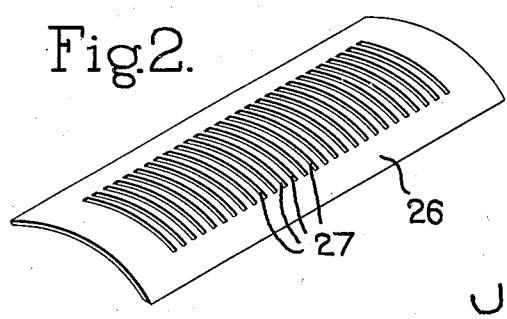
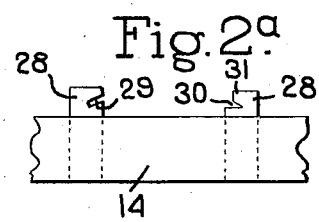
Inventor.
Joseph P. Spang
by Heard Smith & Tennant.
Attys.

May 13, 1941.  J. P. SPANG  2,241,648
MEAT-SLITTING MACHINE
Filed July 8, 1939  3 Sheets-Sheet 2
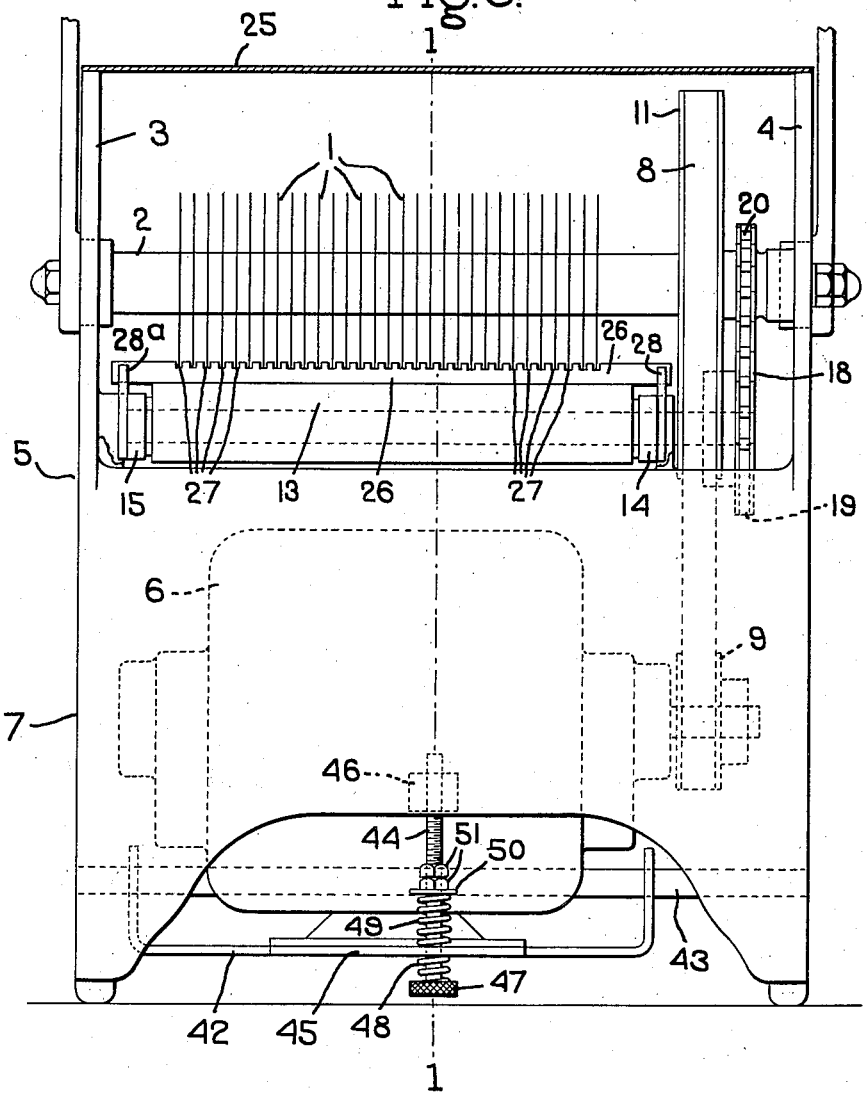
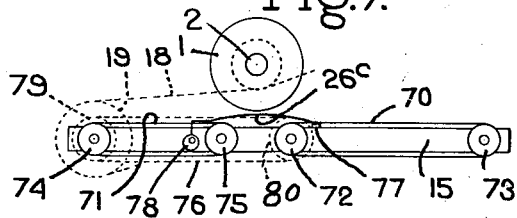
Inventor.
Joseph P. Spang
by Heard Smith & Tennant.
Attys.

May 13, 1941.                J. P. SPANG                 2,241,648
                         MEAT-SLITTING MACHINE
                       Filed July 8, 1939        3 Sheets-Sheet 3

Inventor.
Joseph P. Spang
by Heard Smith & Tennant.
Attys.

Patented May 13, 1941

2,241,648

UNITED STATES PATENT OFFICE 2,241,648

MEAT-SLITTING MACHINE

Joseph P. Spang, Quincy, Mass., assignor to Cube Steak Machine Company, Inc., Boston, Mass., a corporation of Massachusetts Application July 8, 1939, Serial No. 283,449

5 Claims. (Cl. 146—98)

This invention relates to meat-slitting machines of the type having a set of rotary slitting knives and an endless feed apron for feeding the meat to and delivering it from the knives.

One of the objects of the present invention is to provide a meat slitting machine of this type with novel means for supporting the meat while it is being acted on by the knives, so that the slice of meat may be either cut entirely through by the knives or may be slit only part way through.

Another object of the invention is to provide a novel means for supporting the motor by which the knives are driven. Other objects of the invention are to improve generally meat-slitting machines of the above type in the particulars hereinafter set forth.

In the drawings, wherein I have shown some embodiments of my invention:

Fig. 1 is a vertical sectional view on the line 1—1, Fig. 3;

Fig. 2 is a perspective view of the grid or bridge member by which the meat is supported while it is being acted on by the knives; Fig. 2a is a fragmentary view showing the supports for the bridge member illustrated in Fig. 1;

Fig. 3 is an end view of Fig. 2, the hood or cover being shown in section;

Fig. 7 is a view showing a different embodiment of the invention.

Figure 4:
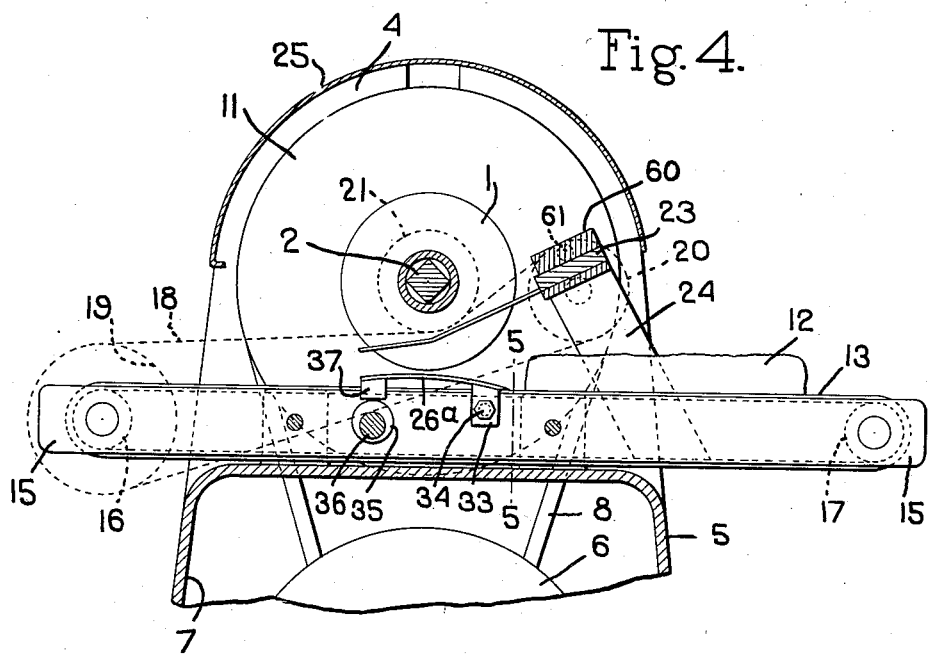
Fig. 4 is a fragmentary sectional view similar to Fig. 1 but showing a different embodiment of the invention.

Referring now to Figs. 1 to 3, the rotary knives by which the meat is slit are indicated at 1, there being a plurality or gang of such knives which are mounted on a knife shaft 2 that is journaled in uprights 3, 4, forming part of the machine frame 5. The knife shaft may be rotated in any approved way, and I have shown for this purpose a motor 6 which is housed in the hollow base portion 7 of the machine frame 5. This motor is belted to the knife shaft 2 by means of a driving belt 8 which passes around a pulley 9 on the motor shaft 10 and also around a pulley 11 on the knife shaft 2.

The slice of meat or material to be cut by the knives, which is indicated at 12, is fed to the knives and delivered therefrom in slit form by means of an endless feed apron 13. This feed apron is carried by an apron-supporting frame which is mounted on the machine frame and is situated between the uprights 3 and 4, said apron-supporting frame comprising two side rails 14 and 15 which are suitably connected together and which carry in their ends two rolls 16 and 17 about which the endless apron 13 passes.

The roll 16 is a driving roll and serves to give operative movement to the belt. This roll 16 may be driven in any suitable or usual way, that herein illustrated comprising a sprocket chain 18 which passes around a sprocket wheel 19 fast with the driving roll 16 and around an idler sprocket wheel 20 mounted on the frame, the upper run of the sprocket chain 18 passing around under and having driving connection with a sprocket wheel 21 fast on the knife shaft 2. This driving connection is so designed that the peripheral speed of the knives 1 will be greater than the surface speed or speed of movement of the feed apron 13.

22 indicates stripper fingers which engage the upper surface of the meat while it is being acted on by the knives, said stripper fingers serving to hold the meat against its support while it is being slit, and also serving to prevent the meat from being lifted off from said support by the knives. These stripper fingers may have any suitable or usual construction and are shown as carried by a head 23 which is removably supported on a supporting bar 60 that is pivotally mounted at 61 in bracket arms 24 rising from the side rails 14 and 15 in a manner similar to that shown in my co-pending application, Ser. No. 272,602, filed May 9, 1939. The pivotal mounting of the head provides for adjusting the stripper fingers vertically. I propose to use means similar to that shown in my said application Ser. No. 272,602 for adjusting the position of the stripper fingers, but have not illustrated such means herein in order not to confuse the drawing.

25 indicates a cover or hood which is carried by the uprights 3, 4 and which partially encloses the knife 1 and the pulley 11.

The machine as thus far described is similar to that illustrated in my said co-pending application, Ser. No. 272,602.

According to the present invention, I have provided novel means in addition to the feed apron 13 for supporting the meat while it is acted on by the knives, this means being so constructed as to make it possible for the knives either to cut entirely through the slice 12, thereby cutting it into strips, or to cut only partially through said slice, thereby to provide a slice having a series of parallel slits cut in one face thereof, which extend nearly, but not entirely through the slice.

This end is accomplished by employing a bridge member which spans the portion of the feed apron directly beneath the knives and over which the slice of meat is fed while it is being acted on by the knives.

In the construction shown in Figs. 1 to 3, this bridge member is arranged so that the knives will cut entirely through the slice, thereby cutting the latter into strips.

The bridge member is indicated at 26 and it comprises a piece of sheet metal which is slightly arched transversely and extends across the feed apron from one side to the other thereof, said bridge member having slots 27 in which the lower edges of the knives 1 are received. This bridge member is shown as being supported in arms which are secured to and rise from the side rails 14 and 15, there being a pair of such arms secured to each side rail. The arms rising from the side rail 15 are indicated at 28a and those rising from the side rail 14 are indicated at 28. The arms of each pair are provided with notches to receive the edges of the bridge member 26, one arm of each pair having a notch 29 and the other having a notch 30. The arm having the notch 30 is cut away at its upper end at 31 to facilitate the insertion of the bridge into the notches.

The bridge member is made of resilient material and it may be placed in its supporting arms by inserting one edge thereof in the notches 29, and then bending said resilient bridge sufficiently to permit the other edge to snap into the notches 30 through the cut-away portion 31 of the corresponding arms.

In Fig. 1, there is provided a supporting rod 32 extending across from one side rail 14 to the other side rail 15 and situated beneath the bridge member, the purpose of this being to prevent the central portion of the apron from sagging.

In the operation of the machine shown in Figs. 1, 2 and 3, the slice 12 of meat to be slit is placed on the feed apron at the right hand end and the forward feeding movement of said apron will carry the slice forwardly and on to the bridge 26. As the slice of meat moves over the bridge 26, it is lifted from the apron and, at the same time, is acted on by the knives. Since the knives dip through the slots 27 in the bridge, said knives will cut entirely through the slice of meat as it is fed over the bridge, thereby cutting the slice into strips. As the slice moves on to and over the bridge, the adhesion between the trailing end of the slice and the apron will cause the slice to be moved forwardly over the bridge, and as soon as the knives begin to act on the meat, the rotary movement of the knives will have a tendency to feed the meat forward. As the meat passes over and beyond the bridge 26 and the leading edge thereof comes again into engagement with the apron, then the adhesion between the apron and the meat will give a forward feeding movement to the meat.

The dimension of the bridge in the direction of the feeding movement is preferably smaller than the corresponding dimension of an ordinary slice of meat, so that as the meat is being fed beneath the knives, there will at all times be sufficient surface contact between the meat and the apron to insure the proper feeding movement of the meat as it passes over the bridge, especially in view of the fact that the rotary movement of the knives have a tendency to feed the meat forward.

Figure 5:
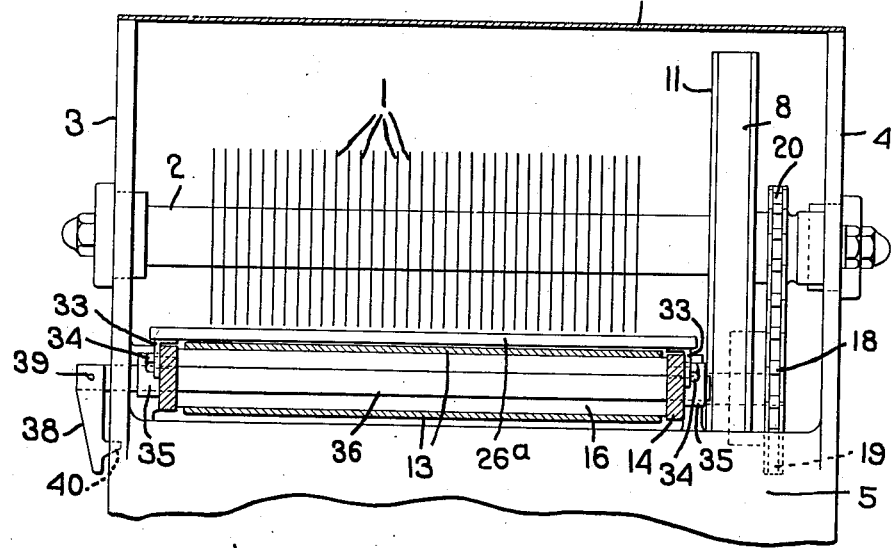
Fig. 5 is a section on the line 5—5, Fig. 4.

In Figs. 4 and 5, I have illustrated an embodiment of the invention which is designed to cut slits only part way through the slice of meat and which also has a construction which permits the depth of the slit in the meat to be varied.

The knives, the knife rotating means and the feed apron in Figs. 4 and 5 have the same construction as that illustrated in Figs. 1, 2 and 3. In this embodiment, however, the bridge member is indicated at 26a and it is pivotally mounted on the side rails 14 and 15, and means are provided for adjusting it toward and from the knives. The bridge is shown as having brackets 33 secured to it at one edge, said brackets being pivotally mounted to the side rails 14, 15, as shown at 34. The other or left hand edge of the bridge can be adjusted up or down by means of a cam 35 carried by a shaft 36 which is journaled in the two side rails 14 and 15. The bridge 26a has a follower member 37 on its under side which rests against the cam. The bridge 26a is shown as in its highest position in Fig. 4, in which position it is slightly separated from the lower edge of the knives 1. By rotating the shaft 36 and thus turning the cam 35, the left hand edge of the bridge will be lowered thereby separating it further from the knives.

With the parts adjusted as shown in Fig. 4, the knives 1 will cut a series of slits in the slice 12 of the meat, which slits extend partially but not entirely through the slice. If it is desired to cut slits of a less depth, then the shaft 36 may be turned to adjust the cam 35 into a position to lower the bridge 26a.

The shaft 36 may be turned in any approved way, although I have herein shown for this purpose a handle member 38 which is pivotally mounted to the projecting end of said shaft, as shown at 39. This handle member has a locking projection 40 adapted to engage any one of a number of recesses in the frame for the purpose of holding the shaft 36 in any adjusted position.

The bridge member 26a shown in Fig. 4 is not provided with slots. On the contrary, it has a smooth nonperforated upper surface, and thus could not be used for cutting slits clear through the slice of meat.

Figure 6:
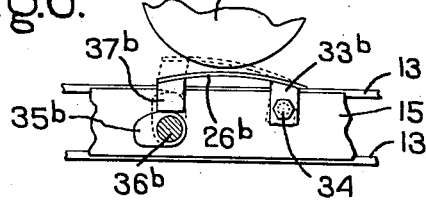
Fig. 6 is a fragmentary view showing still a different embodiment of the invention.

In Fig. 6 I have shown an embodiment wherein the adjustable bridge member is provided with slots so that it can be used either for cutting slits partially but not entirely through the slice or for cutting clear through the slice.

The bridge member in Fig. 6 is shown at 26b and it is provided at its right hand edge with brackets 33b which are pivoted to the side rails 14 and 15, as shown at 34. This bridge 26b is provided at its left hand end with a follower 37b which rests on a cam 35b carried by a shaft 36b that extends across from one side rail to the other, and which is journaled in said side rails. The cam 35b is such that the bridge member 26b may be adjusted into a lowered position shown in full lines where it is entirely below the knives and separated therefrom, or may be adjusted into a raised position in which the knives 1 extend through the slots in the bridge. When the parts are in the position shown in Fig. 6, the knives will cut slits partially but not entirely through the slice. When the bridge member is in the raised position shown in dotted lines, then the knives will cut clear through the slice of meat, thereby cutting it into strips.

In the embodiments of the invention shown in

Figs. 1 to 6, the feeding apron is a single unit extending from one end to the other of the side rails 14, 15, and having an input portion by which the meat is fed to the knives and an output portion by which the slit meat is delivered from the knives, and the bridge spans the space between the input and output portions. In Fig. 7 I have illustrated a different embodiment of the invention wherein the input and output portions of the feeding apron are made in separate sections, an input section 70 which feeds the slice of meat to the knives 1 and an output section 71 which delivers the slit meat from the knives. With this arrangement, the input section 70 extends around two rollers 72, 73, which are mounted in the side rails 14, 15, and the output section 71 extends around two rolls 74, 75, also mounted in the side rails 14, 15. The output section 71 may be driven in the manner shown in Figs. 1 to 6 by means of the sprocket chain 18 and sprocket wheel 19, which latter is rigid with the roll 74. I have herein shown the input section 70 of the feeding apron as being driven from the output section 71 by means of a sprocket chain 76 which extends around sprocket wheels 79 and 80 that are rigid with the rolls 74 and 72 respectively.

In this embodiment of the invention there is provided a bridge member 26c which spans the space between the input section and the output section, just as the bridge in Figs. 1 to 6 spans the space between the input and output portions of the feeding apron. This bridge 26c may be similar to that shown in either Fig. 4 or 6, it being pivoted on the side rails 14, 15, as indicated at 77, and a cam 78 being provided for adjusting the bridge member up or down. This cam 78 may be similar to that shown in Fig. 4 or 6.

In all embodiments of the invention, the feeding apron, whether it is a single unit or is made in sections, has an input portion by which the meat is fed to the knives and an output portion by which the slit slice is delivered from the knives, and a bridge member is provided which spans the space between the input portion of the feed apron and the output portion thereof. Where the feed apron is a single unit, as shown in Figs. 1 and 4, the input portion of the feeding apron is that portion which feeds the meat to the knives while the output portion is that portion which delivers the slit meat from the knives.

The motor 6 is shown as supported on a platform 42 which is pivotally mounted to the frame 5 at 43. In the present embodiment of the invention, the opposite or free end of the platform is supported betweeen two springs which give a cushioning effect and absorb vibration. Means are also provided for adjusting the tension of the springs and for adjusting the position vertically of the platform so as to secure the proper tension on the belt 8. For this purpose I employ an adjusting screw 44 which extends through an opening in the edge 45 of the platform and which has screw threaded engagement with the boss 46 on the inside of the hollow portion 7 of the frame. The screw 44 is provided with a knurled head 47 by which it may be adjusted. 48 and 49 indicate two springs encircling the screw 44, one spring being confined between the portion 45 of the platform and the head 47 of the screw, and the other spring being confined between said portion 45 and a collar 50 which is adjustable longitudinally of the screw and is held in adjusted position by lock nuts 51.

The free edge of the platform is thus held between two cushioning springs and by adjusting the position of the collar 50, the springs may be given any desired tension, and the vertical position of the platform 42 may be changed in order to secure the correct tension of the driving belt 8.

The two springs 48, 49 absorb any vibration in the platform and are conducive to quietness in the operation of the machine.

While I have shown two springs 48 and 49, yet the use of the single spring 49 between the platform and the collar 50 will be quite effective in cushioning any upward movement of the platform. When a slice of meat is introduced beneath the knives, the drag of the knives on the meat puts an extra strain on the active side of the belt which will tend to raise the motor and platform slightly. This rising movement of the motor will be cushioned by the spring 49.

In the construction illustrated, the machine is designed to give the meat a feeding movement toward the left, but by employing a suitable reversing means for reversing the direction of rotation of the knife shaft and belt, the meat may be fed through the machine in either direction, it being understood that a machine having provision for rotating the knives and moving the apron in either direction will be provided with a suitable stripper mechanism which would permit this reversing action.

I claim:

1. A meat-slitting machine comprising a machine frame having two uprights, a set of rotary slitting knives carried by said uprights, means to rotate the knives, an apron-supporting frame mounted on the machine frame between said uprights and comprising two side rails, an endless feed apron carried by said apron-supporting frame and providing an input portion to feed a slice of meat to the knives and an output portion to deliver the slit slice from the knives, means to operate the apron, a pair of notched arms rising from each side rail, a sheet metal bridge member extending across the apron beneath the knives and supported in the notches of the arms, said apron spanning the space between the input and output portions of the apron and over which the slice of meat is fed as it is being acted on by the knives.

2. A meat-slitting machine comprising a machine frame having two uprights, a set of rotary slitting knives carried by said uprights, means to rotate the knives, an apron-supporting frame mounted on the machine frame between said uprights and comprising two side rails, an endless feed apron carried by said apron-supporting frame and providing an input portion to feed a slice of meat to the knives and an output portion to deliver the slit slice from the knives, means to operate the apron, a pair of notched arms rising from each side rail, a bridge member of resilient sheet metal extending across the apron beneath the knives and having its edges retained in the notches of said arms by the resiliency thereof, said bridge member spanning the space between the input portion and output portion of the apron and over which the slice of meat is fed while it is being acted on by the knives.

3. A meat-slitting machine comprising a machine frame having two uprights, a set of rotary slitting knives carried by said uprights, means to rotate the knives, an apron-supporting frame mounted on the machine frame between said uprights and comprising two side rails, an endless feed apron carried by said apron-supporting frame and providing an input portion to feed a slice of meat to the knives and an output portion to deliver the slit slice from the knives, means to operate the apron, a bridge member pivoted to the side rails and extending across the apron beneath the knives, said bridge member spanning the space between the input and output portions of the apron, and means for swinging the bridge about its pivot thereby to adjust its position toward and from the knives.

4. A meat-slitting machine comprising a machine frame having two uprights, a set of rotary slitting knives carried by said uprights, means to rotate the knives, an apron-supporting frame mounted on the machine frame between said uprights and comprising two side rails, an endless feed apron carried by said apron-supporting frame and providing an input portion to feed a slice of meat to the knives and an output portion to deliver the slit slice from the knives, means to operate the apron, a sheet metal bridge member extending across the apron beneath the knives and spanning the space between the input and output portions of the apron and over which the slice of meat is fed as it is being acted on by the knives, said bridge member having slots in which the knives may operate, means pivotally mounting said bridge member on the side rails, and means for swinging the bridge member about its pivot, thereby to place it either in a position in which the knives operate in said slots or in a position in which it is located below the knives, whereby the machine may be adjusted to cut either entirely through the slice or only part way through the same.

5. A meat-slitting machine comprising a machine frame having two uprights, a set of rotary slitting knives carried by said uprights, means to rotate the knives, an apron-supporting frame mounted on the machine frame between said uprights and comprising two side rails, an endless feed apron carried by said apron-supporting frame and providing an input portion to feed a slice of meat to the knives and an output portion to deliver the slit slice from the knives, means carried by the side rails and situated beneath the bridge member for supporting the upper run of the apron in a substantially horizontal plane, means to operate the apron, a sheet metal bridge member extending across the apron beneath the knives and spanning the space between the input and output portions of the apron and over which the slice of meat is fed as it is being acted on by the knives, said bridge member having slots in which the knives may operate, means pivotally mounting said bridge member on the side rails, and means for swinging the bridge member about its pivot, thereby to place it either in a position in which the knives operate in said slots or in a position in which it is located below the knives, whereby the machine may be adjusted to cut either entirely through the slice or only part way through the same.

JOSEPH P. SPANG.